(12) United States Patent
Dong et al.

(10) Patent No.: US 11,419,348 B2
(45) Date of Patent: *Aug. 23, 2022

(54) SYSTEM AND METHOD FOR AUTOMATICALLY CLEANING AND WASHING ICE CREAM OR YOGURT MACHINE

(71) Applicants: Lingyu Dong, Temple City, CA (US); Charles Dong, Temple City, CA (US)

(72) Inventors: Lingyu Dong, Temple City, CA (US); Charles Dong, Temple City, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 15/431,773

(22) Filed: Feb. 14, 2017

(65) Prior Publication Data

US 2017/0347683 A1    Dec. 7, 2017

Related U.S. Application Data

(60) Provisional application No. 62/345,765, filed on Jun. 4, 2016.

(51) Int. Cl.
*A23G 9/30* (2006.01)

(52) U.S. Cl.
CPC ..................... *A23G 9/30* (2013.01)

(58) Field of Classification Search
None
See application file for complete search history.

(56) References Cited

U.S. PATENT DOCUMENTS

| | | | | |
|---|---|---|---|---|
| 4,860,550 A * | 8/1989 | Aoki | ...................... | A23G 9/163 62/135 |
| 5,105,851 A * | 4/1992 | Fogelman | ............. | F16K 11/083 137/625.11 |
| 2002/0043071 A1* | 4/2002 | Frank | ..................... | A23G 9/045 62/135 |
| 2002/0162577 A1* | 11/2002 | Cocchi | ..................... | A23G 9/30 134/18 |
| 2006/0213928 A1* | 9/2006 | Ufheil | ..................... | A47J 31/46 222/148 |
| 2006/0243310 A1* | 11/2006 | Cocchi | ................... | A23G 9/045 134/134 |
| 2007/0062212 A1* | 3/2007 | Frank | ....................... | A23G 9/22 62/342 |

* cited by examiner

*Primary Examiner* — Nicole Blan
(74) *Attorney, Agent, or Firm* — Raymond Y. Chan; David and Raymond Patent Firm

(57) ABSTRACT

A system for automatically cleaning and washing an ice cream machines includes a liquid container for storing raw materials; a freezing cylinder connected with the liquid container through a cleaning pathway; a water tank for storing rinse water to rinse the freezing cylinder and the cleaning pathway; a detergent tank for storing detergents to clean and wash the freezing cylinder and the cleaning pathway; a pump arranged on the cleaning pathway to selectively pump the raw material, the rinse water or the detergent; and a control panel adapted to control an on/off and cleaning.

6 Claims, 2 Drawing Sheets

SYSTEM AND METHOD FOR AUTOMATICALLY CLEANING AND WASHING ICE CREAM OR YOGURT MACHINE

CROSS REFERENCE OF RELATED APPLICATION

This application is a non-provisional application that claims the benefit of priority under 35 U.S.C. § 120 to a provisional application, application No. 62/345,765, filed Jun. 4, 2016, which is incorporated herewith by reference in its entity.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to ice cream and yogurt machine cleaning and washing, and more particularly to a system and method for cleaning and washing ice cream or yogurt machine automatically.

Description of Related Arts

Traditional ice cream and yogurt machines or makers are required to periodical wash and clean in order to prevent serious sanitary problems, such as bacterial growth and contamination, generated inside components of the ice cream machines or makers. Generally, due to the complicated structure of the ice cream or yogurt machine, it has to be cleaned and washed manually at least every two to three weeks.

A common cleaning method is the Pasteurization method that does not require to drain out the raw materials inside the direct expansion evaporator cylinder but simply heats the ice cream or yogurt making system, including the direct expansion evaporator cylinder, to a temperature such as 65° C. and keeps such temperature for around 30 minutes. Then, the ice cream or yogurt making system is cooled down to 5° C. in 30 minutes in order to kill the bacteria therein with hot ice cream or yogurt raw material. Each cleaning process must be operated around every 15 days. However, the Pasteurization method, in fact, is not a cleaning nor washing method because the direct expansion evaporator cylinder and the pipelines of the ice cream or yogurt machine have not been actually cleaned or washed but simply try to raise the temperature to kill the bacteria. Practically speaking, the ice cream or yogurt original contained in the ice cream or yogurt machine which had been heated to 65° C. are not suitable to consume and must be drained out to abandon and discard. In addition, this Pasteurization method is not suitable for yogurt because the probiotics in the yogurt will also be killed at the temperature of 65° C.

In order to really clean and wash the ice cream or yogurt machine, it must be disassembled so as to wash and clean the interior of the direct expansion evaporator, the dispenser mechanism and their pipelines manually. For example, in the traditional washing method, the raw materials inside the direct expansion evaporator cylinder is required to be drained out first, and then the cleaning water and detergents are injected into the pipelines of the ice cream machines or markers to drain out the residue inside the ice cream machines or markers.

However, the traditional cleaning and washing method for ice cream machines or markers have several drawbacks.

The dispensing components such as the plunger, the mix hopper, the draw spout, the draw handle, the sector gear, and etc., are required to be disassembled in order to reach the pipelines of flowing passages to clean such components and pipelines. In addition, each part of the components is required to be manually disassembled and reassembled by hand or accessories, so lots of labor and time have to spend during the traditional cleaning and washing method. In other words, since the ice cream or yogurt machine and marker are required to be cleaned and washed periodically, the components are easily to be damaged and broken during disassembling and reassembling. Furthermore, some components of the ice cream machine and marker cannot be cleaned and washed effectively, such as the freezing cylinders (direct expansion evaporator) and valves, so the cleaning and washing efficiency of the traditional washing and cleaning method is relatively low, and the components which cannot be fully cleaned or washed and are easily eroded, and in such a manner, not only that components needs to be repaired, but also that the finished ice cream will be contaminated.

SUMMARY OF THE PRESENT INVENTION

The invention is advantageous in that it provides a system and method for automatically cleaning and washing the ice cream or yogurt machine, wherein the components of the ice cream machines don't need to be disassembled during the cleaning operation in order to enhance the efficiency for cleaning and washing the ice cream or yogurt machine as well as prolong the life-span of the ice cream and yogurt machines.

Another advantage of the invention is to provides a system and method for automatically cleaning and washing the ice cream or yogurt machine, wherein not only the pipelines, including all flowing passages of the ice cream or yogurt, but also the interior of the freezing cylinder of the ice cream or yogurt machine can be washed and cleaned thoroughly, so as to enhance the efficiency for cleaning and washing the ice cream machines.

Another advantage of the invention is to provide a system and method for automatically cleaning and washing the ice cream or yogurt machine, wherein the system comprises a control module to not only control an on/off operation but also a cleaning operation of the ice cream or yogurt machine automatically without any labor in looking after or disassembling any part or component thereof during the cleaning and washing process.

Another advantage of the invention is to provide a system and method for automatically cleaning and washing the ice cream machines, wherein the liquid raw material container can be selectively changed to the water tank or detergent tank during the cleaning and washing process, so as to simply the pipeline and structure of the ice cream or yogurt machine.

Another advantage of the invention is to provide a system and method for automatically cleaning and washing the ice cream machines, wherein the cleaning and washing method is a clean-in-place process that can thoroughly clean and wash all the flowing passages of the ice cream or yogurt, including the interior of the freezing cylinder and the pipelines of the ice cream or yogurt without moving or disassembling any component and connecting any additional equipment to the ice cream or yogurt machine.

Another advantage of the invention is to provide a system and method for automatically cleaning and washing the freezing cylinder of the ice cream or yogurt machine, wherein the refrigerant and the heat exchange channel therein of the freezing cylinder (direct expansion evaporator) which is thermally communicating with the feeding channel of the freezing cylinder with the refrigerant flowing therein for cooling the ice cream or yogurt raw material to frozen product are alternatively and selectively utilized to heat up the frozen ice cream or yogurt in the freezing cylinder for draining out and the cleaning liquid fed into the freezing cylinder for cleaning and washing after the raw material has been drained out.

Additional advantages and features of the invention will become apparent from the description which follows, and may be realized by means of the instrumentalities and combinations particular point out in the appended claims.

According to the present invention, the foregoing and other objects and advantages are attained by a system for automatically cleaning and washing an ice cream or yogurt machine, wherein the system comprises:

a liquid container for storing raw materials;

a freezing cylinder connected with the liquid container through a cleaning pathway;

a rinse containing device comprising at least a water tank for storing rinse water to rinse the freezing cylinder and cleaning pathway which may further comprise a detergent tank for storing one or more detergents to clean and wash the freezing cylinder and cleaning pathway;

a pump arranged on the cleaning pathway to selectively pump the raw material, the rinse water and/or the detergent; and a control module adapted to control an on/off and cleaning operation.

In accordance with another aspect of the invention, the present invention comprises a method for automatically cleaning and washing an ice cream or yogurt machine, wherein the method comprises the following steps:

(a) Stop feeding the raw materials to the freezing cylinder.

(b) Absorb the residues inside the freezing cylinder, and drain out the residues.

(c) Inject the rinse liquid including water and one or more detergents through the freezing cylinder and the pipeline.

(d) Inject rinse water through the freezing cylinder and the pipeline.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
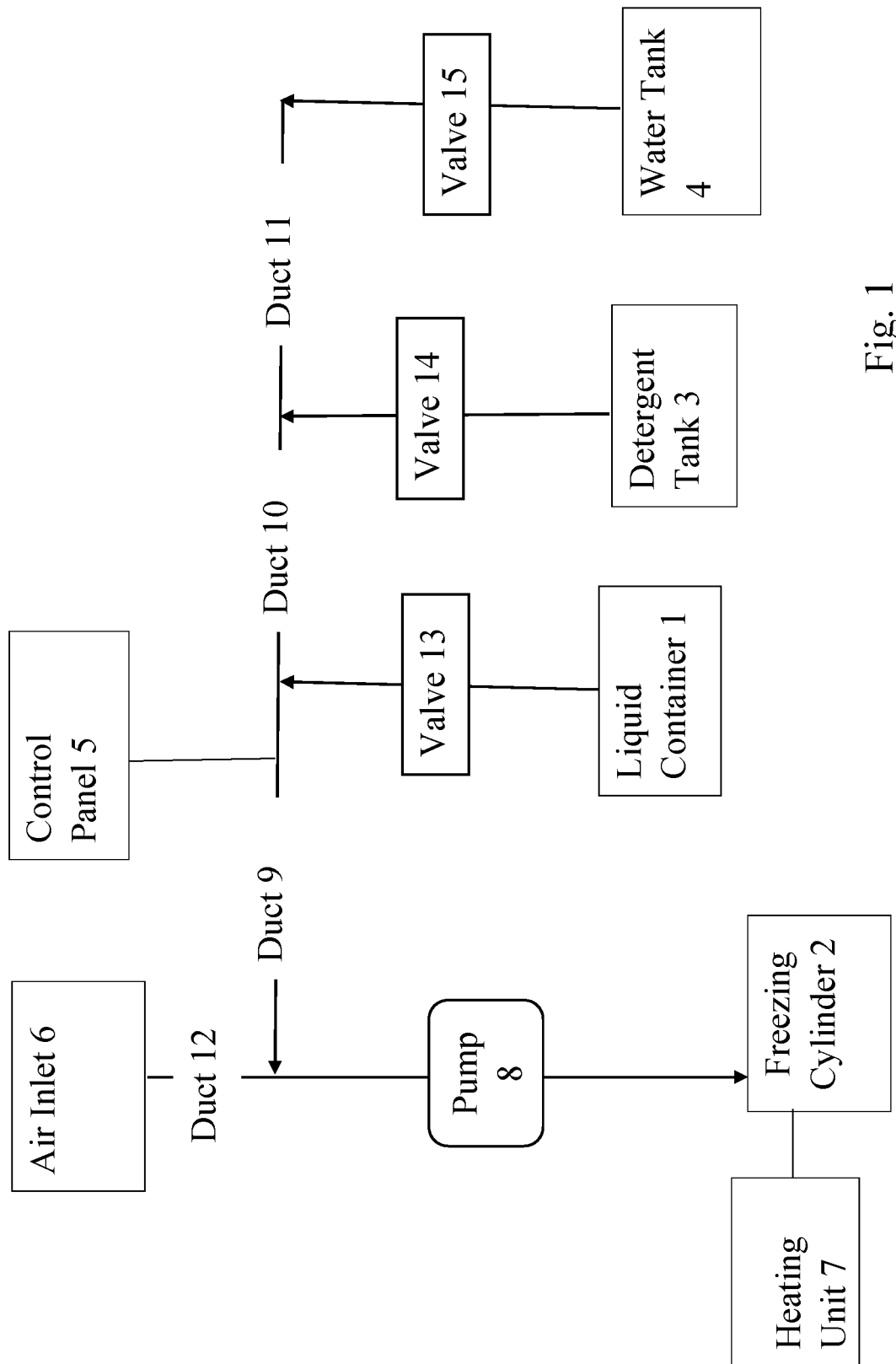
FIG. 1 is a block diagram of a method and system for automatically cleaning and washing ice cream machines according to a first preferred embodiment of the present invention.

Referring to FIG. 1 of the drawings, a system for automatically cleaning and washing ice cream or yogurt machine according to a preferred embodiment of the present invention is illustrated, wherein the system comprises a liquid container 1 for storing raw materials for products such as ice cream, yogurt, beverages and the like in frozen manner, a freezing cylinder 2, for example a direct expansion evaporator, connecting with the liquid container 1 and a dispensing device through a pipeline, adapted to make the ice cream or yogurts from the raw materials, a rinse containing device for storing a rinsing liquid, which may include a detergent tank 3 for storing one or more detergents and a water tank 4 for storing the rinse water, an air inlet 6 adapted to conduct outside air to the freezing cylinder, a pump 8 adapted to selectively pump the raw materials or the detergents and the rinse water into the freezing cylinder 2, and a control module 5 adapted to control an on/off and a cleaning operation of the ice cream or yogurt machine. In addition, the liquid container 1, the freezing cylinder 2, the detergent tank 3, and the water tank 4 are connected with each other through a pipeline, wherein the pipeline comprises a duct 9, a duct 10, a duct 11, and a duct 12 defining a cleaning pathway, wherein the raw materials stored inside the liquid container 1 is fed from the liquid container 1 to the freezing cylinder 2 through the duct 9, and the ice cream or yogurt is made in the freezing cylinder 1 and dispensed through a dispensing system of the ice cream or yogurt machine. In some embodiments, the air can be conducted into the freezing cylinder 1 through the air inlet 6, so the air is mixed with the raw materials inside the freezing cylinder 2 so as to produce the soft-serve products such as ice cream, yogurt, beverages and the like.

According to the first preferred embodiment, the one or more detergents can be fed from the detergent tank 3 to the freezing cylinder 2 through the duct 10 which is integrally connected with the duct 9. The rinse water is fed from the water tank 4 to the freezing cylinder 2 through the duct 11 which is integrally connected with the duct 10. In other words, since the raw materials is fed through the duct 9 to the freezing cylinder 2, the residue will be remained inside the duct 9 and the freezing cylinder 2.

It is worth mentioning that the detergents may also be premixed with the water and contained in the detergent tank 3 and fed into the freezing cylinder 2 through the duct 10. Also, the rinse water can be supplied from a water supply such as a water faucet connected to the duct 11 or the duct 10 via a three-way valve.

Generally, the raw materials for freezing into ice cream or yogurt are fed from the liquid container 1 to the freezing cylinder 2 through the duct 9 by the pump 8, wherein the raw materials will be frozen by the freezing cylinder 2 and dispensed through the dispensing system, and the frozen ice cream or yogurt residues will be remained inside the duct 9 and freezing cylinder 2 even after the raw materials are drained out of the system. Therefore, the rinse water stored inside the rinse water tank 4 and the detergent stored inside the detergent tank 3 are fed through the duct 9 to the freezing cylinder 2 in order to efficiently clean the pipeline and the freezing cylinder 2 of the ice cream or yogurt machine.

The system according to the first preferred embodiment of the present invention further comprises a heating unit 7 operatively connected with the freezing cylinder 2 to heat the freezing cylinder 2, wherein the heating unit 7 is adapted to absorb the ice cream residues remaining inside the freezing cylinder 2, so as to facilitate the ice cream or yogurt residues being completely drained out from the freezing cylinder 2. In addition, after the rinse water fed into the freezing cylinder 2, the rinse water can also be heated by the heating unit 7 to clean and wash out all the ice cream or yogurt residues, and then the freezing cylinder 2 can be rinsed more efficiently by the heated rinse water.

According to the first preferred embodiment, the pump 8 is a peristaltic pump, wherein the pump 8 can be activated by the control module 5 to pump the raw materials, the detergents, or the rinse water to the freezing cylinder 2. The system further comprises a valve 13 arranged at the duct 9, a valve 14 arranged at the duct 10, and a valve 15 arranged at the duct 11. Accordingly, while only the valve 13 is opened, only the raw materials stored in the liquid container 1 is fed to the freezing cylinder 2. While only the valve 14 is opened, only the detergents are fed to the freezing cylinder 2. While only the valve 15 is opened, only the rinse water is fed to the freezing cylinder 2.

According to the first preferred embodiment, the control module 5 comprises an on/off module and a cleaning operation module, wherein the on/off module can be activated to turn on and turn off the operation of the freezing cylinder 2, and the cleaning operation module can be activated to turn on and turn off the cleaning operation. It is worth to mention that the cleaning operation module can be activated to turn on and turn off the cleaning operation by times or usage, that is to turn on and turn off the cleaning operation of the cleaning and washing system of the ice cream or yogurt machine automatically at predetermined or preset times, or to turn on and turn off the cleaning operation of the cleaning and washing system of the ice cream or yogurt machine manually according to the need of the user of the ice cream or yogurt machine. In other words, the cleaning operation can be set up to turn on/turn off by times, such as one week per time, three days per time, or daily, and in addition, the cleaning operation module also can be set up to turn on/turn off the cleaning operation by usage, such as that the cleaning operation module can be activated to turn on the cleaning operation while the raw materials stored inside the liquid container 1 are pumped to the freezing cylinder 2 by 100 loads. And, the control module 5 further comprises a sensor connected to the freezing cylinder 2 to detect the usage loads of the liquid containers 1. It is worth mentioning that the control module 5 further comprises a valve module to control an on/off operation of each of the valve 13, the valve 14, and valve 15.

Figure 2:
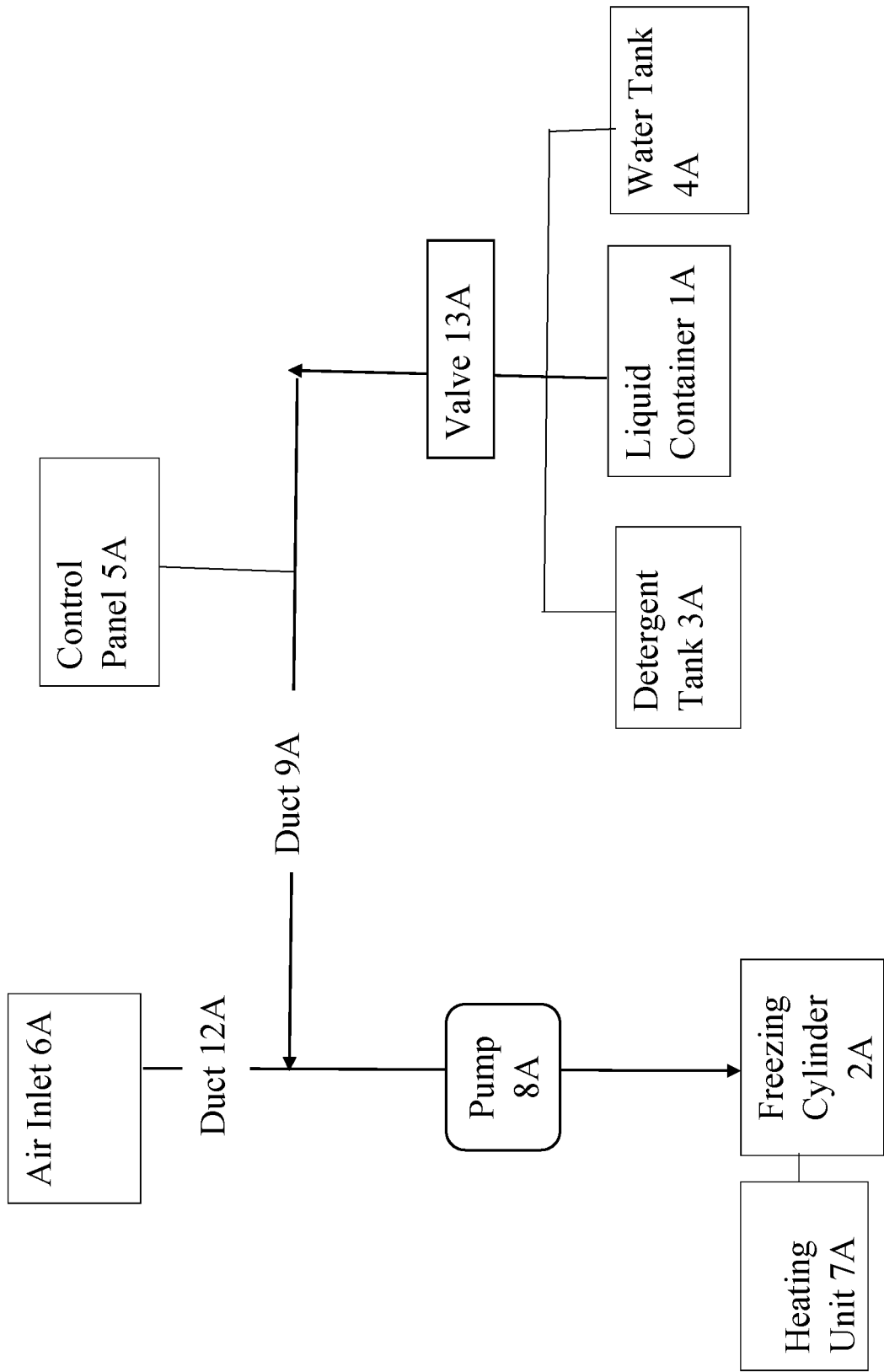
FIG. 2 is a block diagram of a method and system for automatically cleaning and washing ice cream machines according to a second preferred embodiment of the present invention.

Referring to FIG. 2 of the drawings, a system of automatically cleaning and washing the ice cream or yogurt machine according to a second preferred embodiment of the present invention is illustrated, wherein the system comprises a liquid container 1A for storing raw materials for the soft-serve products, such as ice cream, yogurt, beverages and etc., a freezing cylinder 2A adapted to freeze the raw materials to make the frozen ice cream or yogurts, a rinse containing device which may comprises a detergent tank 3A for storing one or more cleaning detergents and a water tank 4A for storing the rinse water, an air inlet 6A adapted to conduct outside air to the freezing cylinder 2A, a pump 8A adapted to pump the raw materials, the detergent, and the rinse water into the freezing cylinder 2A, and a control module 5A adapted to control an on/off and a cleaning operation of the ice cream or yogurt machine, wherein the raw materials stored inside the liquid container 1A is fed from the liquid container 1A to the freezing cylinder 2A through the duct 9A, and the ice cream or yogurt is made in the freezing cylinder 2A. In one embodiment, the air can be conducted into the freezing cylinder 2A through the air inlet 6A, so the air can be mixed with the raw materials inside the freezing cylinder 2A so as to produce the ice cream or yogurt product.

The liquid container 1A can be selectively replaced by rinse containing device, such as the water tank 4A or detergent tank 3A, in order to process the cleaning operation, wherein the liquid container 1A, the water tank 4A, and the detergent tank 3A can be selectively connected to the duct 9A to selectively pump the raw materials, the rinse water, or the detergents into the freezing cylinder 2A.

The system according to the second preferred embodiment of the present invention may further comprise a heating unit 7A operatively connected with the freezing cylinder 2A to heat the freezing cylinder 2A, wherein the heating unit 7A is adapted to absorb the ice cream or yogurt residues remaining inside the freezing cylinder 2A, so as to facilitate the ice cream or yogurt residues being drained out from the freezing cylinder 2A. In addition, after the rinse water fed into the freezing cylinder 2A, the rinse water can be selectively heated by the heating unit 7A, and then the freezing cylinder 2A can be rinsed by the rinse water or heated rinse water.

The system according to the second preferred embodiment of the present invention may further comprise a valve 13A arranged at the duct 9A. Accordingly, while the valve 13A is opened, the raw materials stored inside the liquid container 1A is fed to the freezing cylinder 2A as long as the duct 9A is connected to the liquid container 1A. If the duct 9A is connected to the detergent tank 3A, the detergents are fed to the freezing cylinder 2A. If the duct 9A is connected to the water tank 3A, the rinse water is fed to the freezing cylinder 2A.

According to the second preferred embodiment, the control module 5A comprises an on/off module and a cleaning operation module, wherein the on/off module can be activated to turn on and turn off the operation of the freezing cylinder 2A, and the cleaning operation module can be activated to turn on and turn off the cleaning operation. It is worth mentioning that the cleaning operation module can be activated to turn on and turn off by times or usage, wherein the cleaning operation can be set up to turn on/turn off automatically according to predetermined or preset times, such as one week per time, three days per time, or daily after the business hours, and the cleaning operation module also can be set up to turn on/turn off by usage, that is being manually activated by the user according to his or her actually need. For example, the cleaning operation module can be activated to turn on the cleaning operation while the raw materials stored inside the liquid container 1A are pumped to the freezing cylinder 2A by 100 loads. And, the control module 5A may further comprise a sensor connected to the liquid container 1A to detect the usage loads of the liquid containers 1A. It is worth to mention that the control panel 5A further comprises a valve module to control an on/off operation of the valve 13A.

According to the above preferred embodiments, it is worth mentioning that the system for cleaning and washing the ice cream or yogurt machine includes mostly the components of the ice cream or yogurt machine, such as the liquid container 1, 1A, the freezing cylinder 2, 2A, the pump 8, 8A, and the control module 8, 8A. In order to convert an ice cream or yogurt machine to equip with the system for cleaning and washing the ice cream or yogurt machine, the machine may simply be modified to provide the ducts 9, 10, 11, 12, the rinse containing device including the water and detergent tanks 3, 3A, 4, 4A, and the valves 13, 14, 15, and to modified the control module 5, 5A to provide the on/off module and cleaning operation module.

According to the above preferred embodiment, a method for automatically cleaning and washing the ice cream or yogurt machine is provided, wherein the method comprises the steps of:

(a) stopping feeding the raw materials to the freezing cylinder 2, 2A;

(b) absorbing the ice cream or yogurt residue inside the freezing cylinder 2, 2A, and draining out the residue;

(c) injecting the water through the freezing cylinder 2, 2A and the pipeline; and/or (d) injecting the one or more detergents or detergents mixed with water through the freezing cylinder 2, 2A and the pipeline; and (e) finally, injecting the rinse water through the freezing cylinder 2, 2A and the pipeline.

In the step (a), the pump 8, 8A is activated to be turned off by the control module 5, 5A, so that no raw material is fed into the freezing cylinder 2, 2A. Alternatively, the valve 13 can be turned off by the control module 5, 5A, no raw material is fed into the freezing cylinder 2, 2A. It is worth to mention that, in the second preferred embodiment, the liquid container, 1A can be selectively replaced by the rinse containing device, including the water tank 4A and/or the detergent tank 3A, so that while the valve 13A is opened, the raw materials, the rinse water, or the detergents can be selectively fed into the freezing cylinder 2A through the duct 9A.

In the step (b), the freezing cylinder 2, 2A is heated by the heating unit 7, 7A, and the ice cream or yogurt residue is dissolved and absorbed by the heated water or water mixed with detergents and then drained out from the freezing cylinder 2, 2A.

In the step (c), in the first preferred embodiment, the valve 13 and the valve 14 are closed, the valve 15 is turned on, and the pump is turned on, so that the rinse water can be fed through the pipeline and the freezing cylinder 2, so as to clean and wash the pipeline and the freezing cylinder 2.

Accordingly, the step (c) further comprises a step of (c1): heating the rinse water, wherein the heated rinse water is passing through the pipeline and the freezing cylinder 2, 2A, so as to wash and clean the pipeline and the freezing cylinder 2, 2A. In other words, the heated rinse water has a better washing efficiency than the regular temperature rinse water.

In the step (d), in the first preferred embodiment, the valve 13 is closed, the valve 14 is turned on, and the pump 8 is turned on, so that the one or more detergents can be fed through the pipeline and the freezing cylinder 2, so as to clean and wash the pipeline and the freezing cylinder 2.

In the step (e), the detergent residue can be cleaned and drained out by the rinse water. In other words, the one or more detergents are usually chemicals, so it may cause harmful for the human body. Therefore, the step (e) can prevent the detergents remained inside the pipeline and the freezing cylinder 2, 2A. Of course, if the detergents are made of edible elements, the step (e) may also be omitted.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for automatically cleaning and washing an ice cream or yogurt machine which comprises a liquid container, a freezing cylinder connecting with the liquid container, a dispensing device through a pipeline adapted to make ice cream or yogurt from one or more raw materials, a rinse containing device for storing a rinsing liquid, which include a detergent tank for storing one or more detergents and a water tank for storing a rinse water, a pump adapted to selectively pump the raw materials or the one or more detergents and the rinse water into the freezing cylinder, a heating unit operatively connected with the freezing cylinder to heat the freezing cylinder, and a control module adapted to control a cleaning operation of the ice cream or yogurt machine, wherein the liquid container, the freezing cylinder, the detergent tank and the water tank are connected with each other through the pipeline defining a cleaning pathway;

wherein the method comprises the steps of:

(a) activating the cleaning operation by times automatically by the control module to turn off an operation of the freezing cylinder and turn on the cleaning operation, wherein the cleaning operation is set up to turn on and turn off by a setting of time selected from the group consisting essentially of daily, one week per time and three days per time;

(b) stopping feeding the one or more raw materials from the liquid container for making ice cream or yogurt to the freezing cylinder and the pipeline of the ice cream or yogurt machine;

(c) draining out the ice cream or yogurt inside the freezing cylinder and the pipeline;

(d) operating the heating unit to heat the freezing cylinder to warm up and melt ice cream or yogurt residues inside the freezing cylinder and feeding the rinse water from the water tank through the freezing cylinder and the pipeline by the pump;

(e) heating the rinse water fed through the freezing cylinder by the heating unit to dissolve and absorb the ice cream or yogurt residues remaining inside the freezing cylinder by the heated rinse water to clean and wash out the ice cream or yogurt residues until the ice cream or yogurt residues being completely drained out from the freezing cylinder;

(f) feeding the rinse water from the water tank and the one or more detergents from the detergent tank through the pipeline and the freezing cylinder to clean the pipeline and the freezing cylinder; and (g) feeding the rinse water to the pipeline and the freezing cylinder until remaining detergent residue in the freezing cylinder and the pipeline is cleaned and drained.

2. The method, as recited in claim 1, wherein the liquid container, the water tank and the detergent tank are selectively connected to a first duct of the pipeline to selectively pump the one or more raw materials, the rinse water or the one or more detergents through the freezing cylinder, wherein the ice cream or yogurt machine further comprises a valve arranged at the first duct, such that when the valve is opened, the one or more raw materials stored inside the liquid container is fed to the freezing cylinder as long as the first duct is connected to the liquid container, and that when the first duct is connected to the detergent tank, the one or more detergents are fed to the freezing cylinder, and that when the first duct is connected to the water tank, the rinse water is fed to the freezing cylinder.

3. The method, as recited in claim 1, wherein the ice cream or yogurt machine further comprises a first duct, a second duct and a third duct, wherein the liquid container, the water tank and the detergent tank are selectively connected to the first duct of the pipeline to selectively pump the one or more raw materials, the rinse water or the one or more detergents through the freezing cylinder, wherein the ice cream or yogurt machine further comprises a first valve arranged at the first duct, a second valve arranged at a second duct, a third valve arranged at a third duct to define the cleaning pathway, wherein while only the first valve is opened, only the one or more raw materials stored in the liquid container is fed to the freezing cylinder, wherein while only the second valve is opened, only the one or more detergents are fed to the freezing cylinder, wherein while only the third valve is opened, only the rinse water is fed to the freezing cylinder, wherein the step (d) further comprises the steps of:
  (d1) while the first valve and the second valve are closed, the third valve is turned on, and the pump is turned on, feeding the rinse water from the water tank through the pipeline and the freezing cylinder to clean and wash the pipeline and the freezing cylinder; and
  (d2) while the first valve is closed, the second valve is turned on and the pump is turned on, feeding the one or more detergents from the detergent tank through the pipeline and the freezing cylinder to clean and wash the pipeline and the freezing cylinder.

4. A method for automatically cleaning and washing an ice cream or yogurt machine which comprises a liquid container, a freezing cylinder connecting with the liquid container, a dispensing device through a pipeline adapted to make ice cream or yogurt from one or more raw materials, a rinse containing device for storing a rinsing liquid which include a detergent tank for storing one or more detergents and a water tank for storing water, a pump adapted to selectively pump the one or more raw materials or the one or more detergents and the rinse water into the freezing cylinder, a heating unit operatively connected with the freezing cylinder to heat the freezing cylinder, and a control module adapted to control a cleaning operation of the ice cream or yogurt machine, wherein the liquid container, the freezing cylinder, the detergent tank and the water tank are connected with each other through the pipeline defining a cleaning pathway;
  wherein the method comprises the steps of:
  (a) activating the cleaning operation by usage automatically by the control module to turn off an operation of the freezing cylinder and turn on the cleaning operation, wherein the cleaning operation is activated to turn on while the one or more raw materials stored inside the liquid container are pumped to the freezing cylinder by a predetermined number of loads of usage;
  (b) stopping feeding the one or more raw materials from the liquid container for making ice cream or yogurt to the freezing cylinder and the pipeline of the ice cream or yogurt machine;
  (c) draining out the ice cream or yogurt inside the freezing cylinder and the pipeline;
  (d) operating the heating unit to heat the freezing cylinder to warm up and melt ice cream or yogurt residues inside the freezing cylinder and feeding the rinse water from the water tank through the freezing cylinder and the pipeline by the pump;
  (e) heating the rinse water fed through the freezing cylinder by the heating unit to dissolve and absorb the ice cream or yogurt residues remaining inside the freezing cylinder by the heated rinse water to clean and wash out the ice cream or yogurt residues until the ice cream or yogurt residues being completely drained out from the freezing cylinder;
  (f) feeding the rinse water from the water tank and the one or more detergents from the detergent tank through the pipeline and the freezing cylinder to clean the pipeline and the freezing cylinder; and
  (g) feeding the rinse water to the pipeline and the freezing cylinder until remaining detergent residue in the freezing cylinder and the pipeline is cleaned and drained.

5. The method, as recited in claim 4, wherein the liquid container, the water tank and the detergent tank are selectively connected to a first duct of the pipeline to selectively pump the one or more raw materials, the rinse water or the one or more detergents through the freezing cylinder, wherein the ice cream or yogurt machine further comprises a valve arranged at the first duct, such that when the valve is opened, the one or more raw materials stored inside the liquid container is fed to the freezing cylinder as long as the first duct is connected to the liquid container, and that when the first duct is connected to the detergent tank, the one or more detergents are fed to the freezing cylinder, and that when the first duct is connected to the water tank, the rinse water is fed to the freezing cylinder.

6. The method, as recited in claim 4, wherein the ice cream or yogurt machine further comprises a first duct, a second duct and a third duct, wherein the liquid container, the water tank and the detergent tank are selectively connected to the first duct of the pipeline to selectively pump the one or more raw materials, the rinse water or the one or more detergents through the freezing cylinder, wherein the ice cream or yogurt machine further comprises a first valve arranged at the first duct, a second valve arranged at a second duct, a third valve arranged at a third duct to define the cleaning pathway, wherein while only the first valve is opened, only the one or more raw materials stored in the liquid container is fed to the freezing cylinder, wherein while only the second valve is opened, only the one or more detergents are fed to the freezing cylinder, wherein while only the third valve is opened, only the rinse water is fed to the freezing cylinder, wherein the step (d) further comprises the steps of:
  (d1) while the first valve and the second valve are closed, the third valve is turned on, and the pump is turned on, feeding the rinse water from the water tank through the pipeline and the freezing cylinder to clean and wash the pipeline and the freezing cylinder; and
  (d2) while the first valve is closed, the second valve is turned on and the pump is turned on, feeding the one or more detergents from the detergent tank through the pipeline and the freezing cylinder to clean and wash the pipeline and the freezing cylinder.

\* \* \* \* \*